US012632893B2

(12) United States Patent　(10) Patent No.:　US 12,632,893 B2

Thakur et al.　(45) Date of Patent:　May 19, 2026

(54) SYSTEMS AND METHODS FOR MERCHANT PERSONALIZATION AND RECOMMENDATION

(71) Applicant: PAYPAL, INC., San Jose, CA (US)

(72) Inventors: Bhartendu Thakur, Chennai (IN); Srikant Jayaraman, Pune (IN); Arun Meenakshi Sundaram, Chennai (IN); Vidhya Chandrasekaran, Chennai (IN); Sateesh Sivakoti, Hyderabad (IN); Ashok Srinivas Darsi, Manda (IN); Divya Vinothkumar, Chennai (IN); Angadhjot Hundal, San Francisco, CA (US); Santhosh Krishnan Ramani, Milpitas, CA (US)

(73) Assignee: PAYPAL, INC., San Jose, CA (US)

( * ) Notice: Subject to any disclaimer, the term of this patent is extended or adjusted under 35 U.S.C. 154(b) by 270 days.

(21) Appl. No.: 18/478,656

(22) Filed: Sep. 29, 2023

(65) Prior Publication Data

US 2025/0111422 A1　Apr. 3, 2025

(51) Int. Cl.
　G06Q 30/0601　(2023.01)
　G06N 3/0455　(2023.01)
　(Continued)

(52) U.S. Cl.
　CPC ....... G06Q 30/0631 (2013.01); G06N 3/0455 (2023.01); G06N 3/08 (2013.01); G06Q 30/0202 (2013.01)

(58) Field of Classification Search
　CPC ........... G06Q 30/0631; G06Q 30/0202; G06N 3/0455; G06N 3/08; G06N 3/045
　See application file for complete search history.

(56) References Cited

U.S. PATENT DOCUMENTS

2009/0271246 A1 * 10/2009 Alvarez ................ G06Q 30/02
　　　　　　　　　　　　　　　　　　705/26.7
2014/0372338 A1 * 12/2014 Kim ................... G06Q 30/0282
　　　　　　　　　　　　　　　　　　705/347
(Continued)

FOREIGN PATENT DOCUMENTS

WO　WO-2020010251 A1 *　1/2020　............. G06N 20/20

OTHER PUBLICATIONS

Kon Woo Kwon et al "The Effect of Personalization on Cross-Buying and Shopping Cart Abandonment Based on the S-O-R Framework", Jun. 2000, Asia Pacific Journal of Information Systems vol. 30 No. 2, pp. 252-283 (Year: 2000).*

(Continued)

*Primary Examiner* — Romain Jeanty

(74) *Attorney, Agent, or Firm* — Haynes and Boone, LLP

(57)　ABSTRACT

There are provided systems and methods for providing a merchant recommendation using multiple models. An example system may receive, at a product predictor, an input including a series of products and generate an output including a target product associated with the series of products. The system may generate, at a value evaluator, a value change associated with the target product based at least in part on the output, and generate, at the product predictor, a recommendation including the target product and the value change associated with the target product. The system may further generate, at a seasonal predictor, a seasonal prediction for the output in a future time frame based on the output, and generate, at the product predictor, an updated output including an updated target product based on the seasonal prediction for the output in the future time frame.

20 Claims, 8 Drawing Sheets

100

(51) Int. Cl.
   G06N 3/08          (2023.01)
   G06Q 30/0202       (2023.01)

(56)                References Cited

U.S. PATENT DOCUMENTS

| | | | |
|---|---|---|---|
| 2015/0120411 A1* | 4/2015 | Kneen ................ | G06Q 30/0211 |
| | | | 705/14.13 |
| 2015/0134420 A1* | 5/2015 | Unser ................ | G06Q 30/0205 |
| | | | 705/7.34 |
| 2015/0161705 A1* | 6/2015 | Chauhan ................ | G06Q 40/00 |
| | | | 705/26.7 |
| 2016/0253737 A1* | 9/2016 | Chang .................... | G06Q 50/01 |
| | | | 705/26.7 |
| 2021/0065260 A1* | 3/2021 | Zheng ................ | G06Q 30/0201 |
| 2021/0118036 A1* | 4/2021 | Jiang ...................... | G06N 20/00 |
| 2022/0058227 A1* | 2/2022 | Balakrishnan ..... | G06Q 30/0627 |

OTHER PUBLICATIONS

Xin et al "Learning User Preferences across Multiple Aspects for Merchant Recommendation", Dec. 2015, IEEE International Conference on Data Mining, pp. 865-870 (Year: 2015).*

* cited by examiner

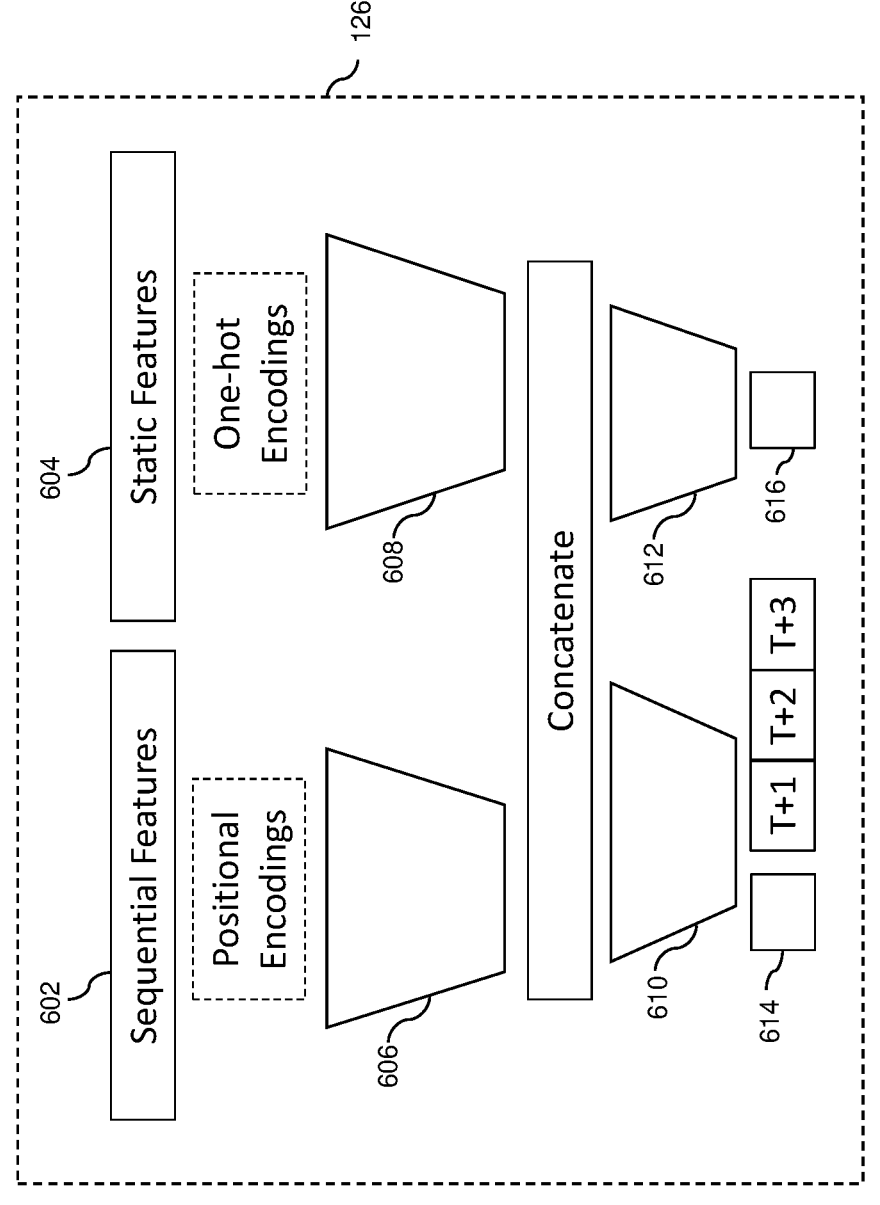
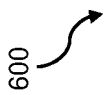
Figure 6

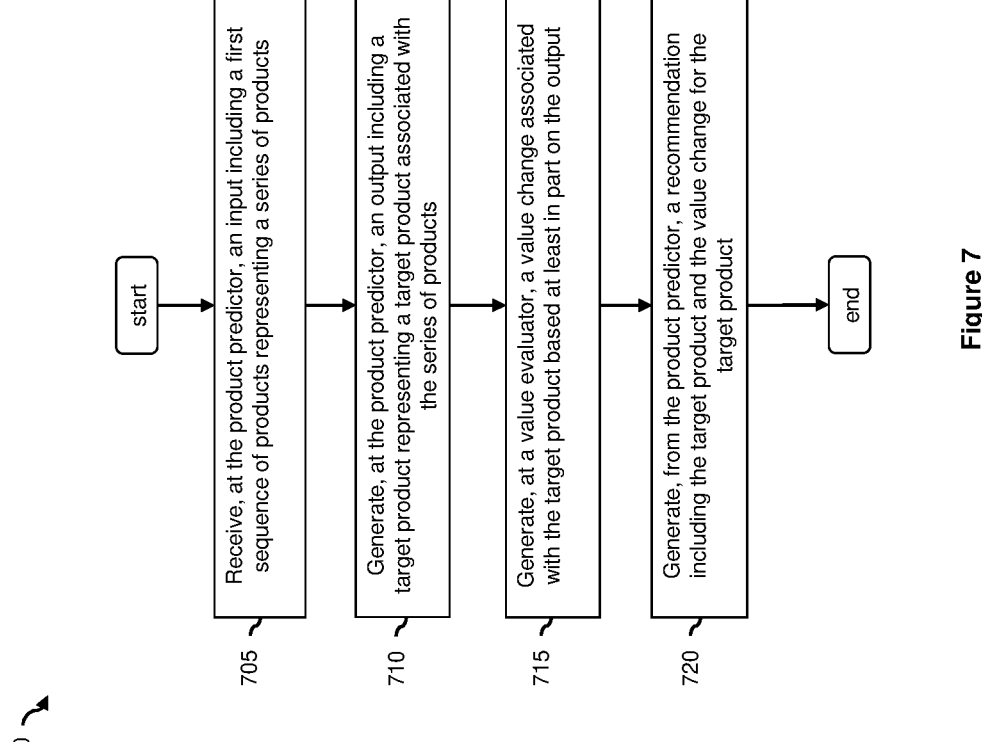

start

705 — Receive, at the product predictor, an input including a first sequence of products representing a series of products 710 — Generate, at the product predictor, an output including a target product representing a target product associated with the series of products 715 — Generate, at a value evaluator, a value change associated with the target product based at least in part on the output 720 — Generate, from the product predictor, a recommendation including the target product and the value change for the target product end

SYSTEMS AND METHODS FOR MERCHANT PERSONALIZATION AND RECOMMENDATION

TECHNICAL FIELD

The present application generally relates to establishing a model for providing a merchant personalization, and more specifically, to establishing a framework including multiple models to provide a value-based, dynamic merchant recommendation.

BACKGROUND

Nowadays, when a merchant selects a service provider, the merchant expects to have a personalized platform that is tailored to their products and preferences (e.g., selecting suitable products to establish the platform, etc.) and to improve customer experience (e.g., providing accurate product recommendations, detecting seasonal events and products, etc.). However, existing solutions cannot provide a dynamic, accurate merchant recommendation when considering multiple factors (e.g., merchant preferences, seasonal product forecasting, foreseeable revenues for each product, etc.) to set up a service or dynamically adjust a merchant strategy for the merchant. Inaccurate or untimely recommendations or predictions can result in providing non-useful content, failure to process a valid transaction, or user experience issues.

As such, a more accurate and dynamic merchant personalization is desirable for a merchant to improve transaction efficiency and user experience.

BRIEF DESCRIPTION OF THE DRAWINGS

FIG. 6 illustrates an exemplary diagram of the seasonal predictor in predicting a seasonal merchant according to an embodiment of the present disclosure;

FIG. 7 is a flowchart showing a process of providing a merchant recommendation according to an embodiment of the present disclosure.

Figure 1:
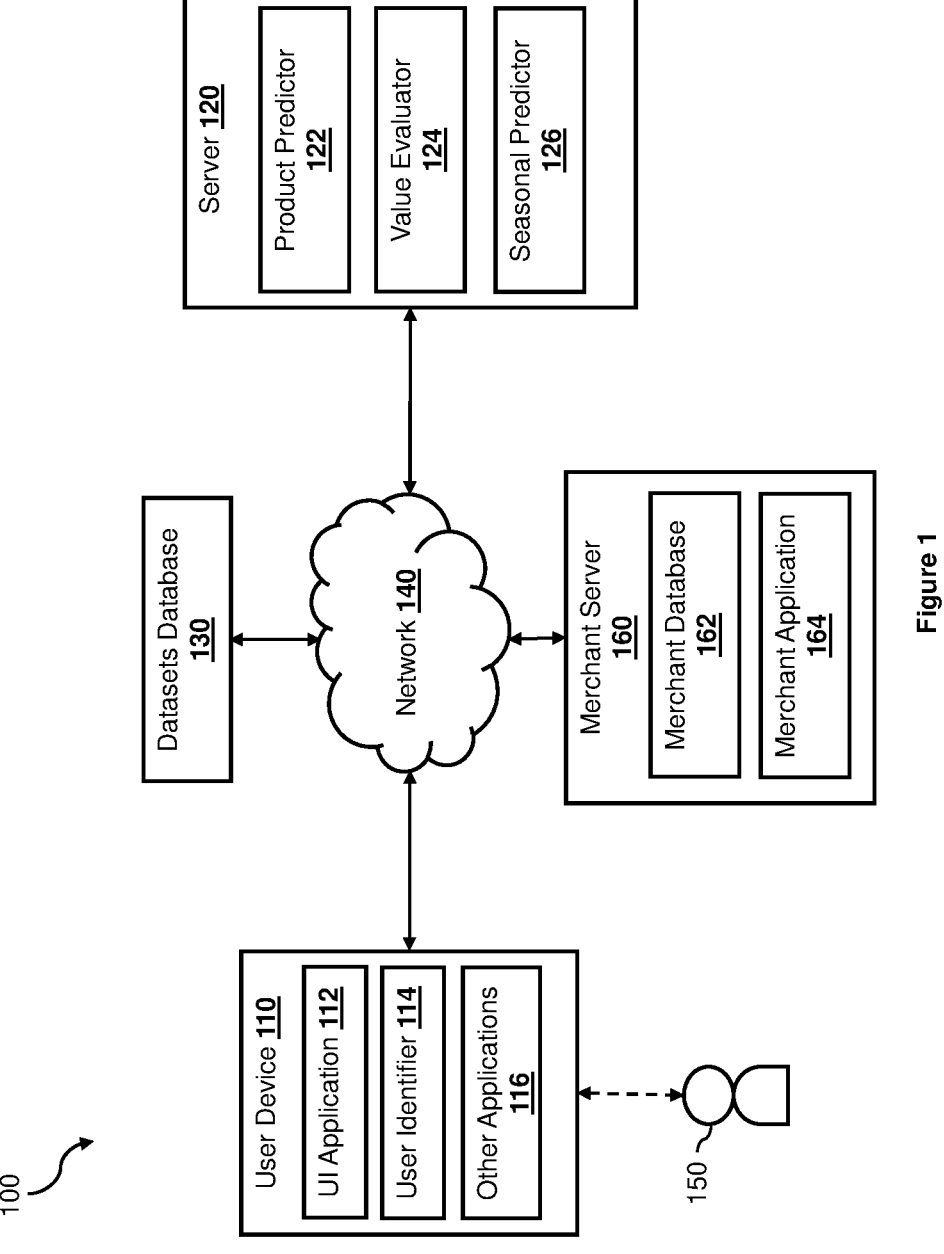
FIG. 1 is a block diagram illustrating an exemplary merchant personalization system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for providing a dynamic merchant personalization, including personalizing product recommendations, predicting a value change when adding a product, and targeting seasonal merchants. The present system may provide a machine learning framework that has a multi-model architecture which provides dynamic, efficient, and accurate recommendations for a user (e.g., a merchant). The framework may include multiple models that incorporate (1) a positional alignment of sequential products for predicting a next product, (2) a feature alignment based on their importance for a faster learning and a re-evaluation for each feature, and (3) a transformation of time series data into a 2D matrix for applying convolutional neural networks (CNN) for detecting a seasonal merchant. Furthermore, each of the models in the framework may coordinate with each other to provide a more precise and dynamic recommendation to fit the merchant's preferences and needs better. For example, a model of the framework may utilize the analysis of the sequential features provided by the other model of the framework and include static features (e.g., geographical data, profile data, merchant industry data, etc.) of the merchant to improve accuracy of predictions and to enable more informed decision-making (e.g., sending a reminder to a seasonal merchant before the season starts).

As discussed above, the framework may include a product predictor for predicting a target product based on a sequence of products. The product predictor may include one or more machine learning models that may be trained based on a set of datasets, and each dataset includes a sequence of historical products, such that, based on the sequence of historical products, the product predictor may predict the target product (e.g., the next product that is inferred to follow the sequence of products). By utilizing the present system to predict the target product, the system may provide a recommendation (e.g., a business model, a product recommendation, or a timely push) to a new merchant who might have similar characteristics with the existing merchants (e.g., the size of the business, the characteristics of the merchant products, and/or the motivation of the merchant), but yet has not been activated, e.g., not available for use by consumers, not onboarded with the service provider, etc. For example, a merchant may be a chief marketing officer at a commerce company, and look for a service provider for customer support, such that the present system may provide a personalized merchant recommendation including service products that are catered based on the merchant's need, such as a virtual online agent that may respond timely in response to a customer's inquires. Furthermore, the framework may include a value evaluator for evaluating an increment of a merchant's customer value (e.g., a value of the merchant that is evaluated based on their products or services, and/or a foreseeable revenue that the products/services may create). The value evaluator may include one or more machine learning models that may be trained based on a set of datasets that have historical delta customer values that indicate a value change when adding different products to the merchant. Therefore, the value evaluator may provide an overview of the importance of each product. Alternatively, the output from the value evaluator may also be another input for the product predictor to re-evaluate a potential target product (e.g., evaluating the customer value for the target product).

In addition, the framework may include a seasonal predictor for detecting a seasonal merchant. The seasonal predictor may include one or more machine learning models that may be trained based on a set of datasets that include the historical sequence of features and static features (e.g., geographical information of the merchant), such that the seasonal predictor may detect a seasonal merchant and provide a customized recommendation (e.g., a calendar-based pattern) for the detected seasonal merchant. Furthermore, the output (e.g., the detected seasonal merchant) of the seasonal predictor may be yet another input for the product predictor to modify the recommendation (e.g., re-evaluating the target product in a specific time frame). By utilizing the framework, the system may efficiently provide a more accurate, dynamic recommendation for a specific merchant by prioritizing the most relevant products.

Moreover, the system may use target encoding to provide a multi-label classification objective (e.g., a feature may have multiple labels), such that the system may identify more nuanced patterns and provide more reliable and accurate predictions. Additionally, the system may provide an advantage in predicting the behavior and risk associated with early merchants (e.g., merchant that have not establish a platform or just recently sign up with the service provider) based on the inherent similarity among existing merchants using static features. Therefore, the system may provide more accurate predictions and useful decision-making for merchants in their early stages.

In this regard, the present systems and methods may be applied to various applications and use cases. For example, the system may be used to provide a personalized risk assessment, e.g., the outputs (including information of detected seasonal merchants) of the system may be utilized for a service for evaluate a risk (e.g., potential fraud) of the merchant. The system may also be applied to facilitate a smooth experience and avoid incorrect declines. By considering specific characteristics and patterns of each merchant, the system may tailor risk assessments and take appropriate actions to mitigate potential risks (e.g., adding addition requirements to validate transactions). The present systems and methods may benefit both the merchants and the service providers by reducing friction and improving overall transaction efficiency, such as the system may optimize the process of onboarding and readiness for the merchants, the merchant may be enabled to start accepting payments quickly and efficiently. In some aspects, the present systems and methods may accurately target merchants before the start of their active season, allow the merchants for implement proactive actions and planning in specific fields whose demands and sales may be heavily affected based on seasonal factors, such as fashion, tourism, and agriculture. By providing timely and accurate insights and predictions, the system may improve the merchant's inventory, marketing efforts, and business strategies.

FIG. 1 illustrates an exemplary machine learning system 100, within which a method for generating a personalized recommendation may be implemented, according to some embodiments of the disclosure. The machine learning system 100 includes a user device 110, a server 120, a datasets database 130, and a merchant server 160 that may be communicatively coupled with each other via a network 140. The datasets database 130, in one embodiment, may be a database storing a plurality of datasets for training various machine learning models (e.g., recurrent neural networks including long short-term memory (LSTM) network) for performing certain tasks (e.g., predicting a target product for a merchant, predicting a value change for the merchant, etc.) which are accessible by the server 120. The server 120, in one embodiment, may include a product predictor 122, a value evaluator 124, and a seasonal predictor 126 for providing the personalized recommendation in response to a request from the merchant server 160. The merchant server 160, in one embodiment, may implement products/services of a service provider which is provided by the server 120, and receive requests from the user device 110 initiated by a user 150. The network 140, in one embodiment, may be implemented as a single network or a combination of multiple networks. For example, in various embodiments, the network 140 may include the internet and/or one or more intranets, landline networks, wireless networks, and/or other appropriate types of communication networks. In another example, the network 140 may comprise a wireless telecommunications network (e.g., cellular phone network) adapted to communicate with other communication networks, such as the Internet.

The user device 110, in one embodiment, may include a user interface (UI) application 112 (e.g., a web browser, a mobile payment application, a downstream application, etc.), which may be utilized by the user 150 to interact with the server 120 over the network 140. In one implementation, the user interface application 112 may include a software program (e.g., a mobile application) that provides a graphical user interface (GUI) for the user 150 to interface and communicate with the server 120 via the network 140. In another implementation, the user interface application 112 may include a browser module that provides a network interface to browse information available over the network 140. For example, the user interface application 112 may be implemented, in part, as a web browser to view information available over the network 140. Thus, the user 150 may use the user interface application 112 to initiate electronic transactions (e.g., login transactions, data access transactions, profile establishment, etc.) with the server 120 and/or the merchant server 160.

For example, the user 150 may, via the user device 110, log into their account and request a transaction (e.g., making a payment or accessing content) via the merchant server 160. The merchant server 160 may determine data associated with the transaction, such as data provided by the user 150 via the user device 110, data associated with the user device 110, and data associated with the user 150, and send the gathered data to the server 120 to be parsed and evaluated. For example, an administrator of the merchant server 160 may have a need to identify which product provided by the service provider might be useful or beneficial for their merchant. The administrator of the merchant server 160 may provide the gathered data (including a series of actions that the user 150 may perform using the service provided by the merchant server 160) to the server 120 for a personalized recommendation. Based on the behaviors observed in the gathered data (e.g., the user 150 reroutes to a financial aid website which offers an installment plan) and the characteristics of the merchant (e.g., characteristics of the merchant products), the product predictor 122, the value evaluator 124, and the seasonal predictor 126 of the server 120 may generate an output including a target product (e.g., a product Pay Later®) for the merchant server 160, and then send the output to the merchant server 160 to proceed with a corresponding action based on the output, e.g., implementing the product Pay Later® on their merchant website, such that the user 150 may utilize Pay Later® to complete the payment process.

The user device 110 may include other applications 116 as may be desired in one or more embodiments of the present disclosure to provide additional functions/features available to the user 150. In one example, such other applications 116 may include security applications for implementing client-side security features, programmatic client applications for interfacing with appropriate application programming interfaces (APIs) over the network 140, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the merchant server 160 via the network 140, and the identifier 114 may be used by the merchant server 160 to associate the user 150 with a particular user account (e.g., and a particular profile), a particular transaction, and/or a particular service at the merchant server 160.

In various implementations, the user 150 may be able to input data and information into an input component (e.g., a keyboard) of the user device 110. For example, the user 150 may use the input component to interact with the UI application 112 (e.g., to conduct a purchase transaction via the merchant server 160 and/or the server 120).

The datasets database 130 may store one or more datasets, for example, including training datasets for training various machine learning models maintained by the server 120. The various machine learning models may be trained and built by the server 120, and may be used by the server 120 for performing various tasks. For example, the datasets database 130 may store datasets associated with characteristics of the merchant (e.g., account actions, transaction related data, product additions, holiday activities, product usage, etc.), datasets associated with users associated with the merchant server 160 (e.g., a user profile of the user 150 registered with the service provided at the merchant server 160) for analyzing the merchant's need and preference, so that the server 120 may generate a personalized recommendation related to the products of the service provider (e.g., PayPal®) for the merchant, in order to ease the process of discovery, trail, and adoption of the products, and create value from using the products for the merchant. For example, a product may be a service (e.g., a checkout service to retrieve authentication information from the user 150 and/or a bank of the user 150), a website plug-in (e.g., a coupon search engine searching across different websites), a design tool (e.g., a UX/UI design system for a website), a marketing tool (e.g., a search optimization engine, and/or an advertising service), an assistance service (e.g., an auto-translation function, and/or a virtual online agent), etc. In some embodiments, each of the datasets in the datasets database 130 may include sequential products, e.g., a sequence of products representing a serial action performed sequentially, or a serial product that may be utilized sequentially. In some embodiments, the datasets including the sequential products may be used to train and build the product predictor 122 for predicting a target product (e.g., a potential product next in need). In some embodiments, the datasets in the datasets database 130 may include a set of historical value changes corresponding to a set of products, e.g., a value change of a product indicating a value difference between a first projected value when the product has not been activated for a period of time and a second projected value when the product has been activated for the period of time. In some embodiments, the datasets including the set of historical value changes may be used to train and build the value evaluator 124 for predicting a value change of a product (e.g., a value/revenue of the product that may be generated). In some embodiments, each of the datasets in the datasets database 130 may include sequential features associated with the merchant (e.g., account actions, transactions derived, product additions, holiday features, product usage associated with the merchant) and static features associated with the merchant (e.g., geographical information, merchant profile, merchant category, merchant flags, merchant industry, etc.). In some embodiments, the datasets including the sequential features and the static features may be used to train and build the seasonal predictor 126 for detecting a seasonal merchant (e.g., a seller that may be active during a period of the year).

The server 120, in various embodiments, may be any of various types of computer servers, e.g., a cluster of computers in a server farm, capable of serving data to other computing devices, including the user device 110, the datasets database 130, and the merchant server 160, via network 140. The server 120 may be associated with different types of entities or systems, such as, but not limited to, various service providers, including payment or transaction service providers (e.g., PayPal®).

The product predictor 122, the value evaluator 124, and the seasonal predictor 126 at the server 120 may retrieve the datasets and parse data in the datasets, and train and build machine learning models respectively. The models implemented at the product predictor 122, the value evaluator 124, and the seasonal predictor 126 may collaborate with each other to provide dynamic and accurate output (e.g., the personalized recommendation) for the merchant. For example, each of the product predictor 122, the value evaluator 124, and the seasonal predictor 126 may consist of one or more models (e.g., the product predictor 122 may include one model for learning previous sequences of products, another model for providing recommendations for merchants who have not activated any products from the service provider, and yet another model for active merchant) to provide outputs in response to different purposes, such that an output of the value evaluator 124 (or the seasonal predictor 126) may be fed to the product predictor 122 as an input/training dataset to re-predict/re-train a target product for the merchant, such as recommending another target product if another target product may create higher value (e.g., revenue, profit, customer value, etc.) for the merchant. Likewise, an output of the seasonal predictor 126 may be fed to the product predictor 122 as an input/training dataset to re-predict/re-train a target product for the merchant, such as recommending another target product if another target product may be active in the upcoming season (e.g., promoting seasonal products/events/activities to a seasonal merchant). The actions and the approaches related to the product predictor 122, the value evaluator 124, and the seasonal predictor 126 of the server 120 will be further described in detail in FIGS. 2-7.

The merchant server 160, in various embodiments, may be maintained by a business entity (or in some cases, by a partner of a business entity that processes transactions on behalf of the business entity). Examples of business entities include merchants, resource information providers, utility providers, online retailers, real estate management providers, social networking platforms, subscription services, a cryptocurrency brokerage platform, etc., which offer various items, services, and content for purchase and process payments for the purchases. The merchant server 160 may include a merchant database 162 for identifying available items or services, which may be made available to the user device 110 for viewing and purchase by the respective users.

The merchant server 160, in one embodiment, may include a merchant application 164, which may be configured to provide information over the network 140 to the server 120 and/or the user interface application 112 of the user device 110. In one embodiment, the merchant application 164 may include a web server that hosts a merchant website for the merchant. For example, the user 150 of the user device 110 may interact with the merchant application 164 through the user interface application 112 over the network 140 to search and view various items or services available for purchase in the merchant database. While only one merchant server 160 is shown in FIG. 1, it has been contemplated that multiple merchant servers, each associated with a different merchant, may be connected to the user device 110 and the server 120 via the network 140.

The merchant server 160, in one embodiment, may be established by an early merchant (e.g., a merchant that recently starts their service using the products of the service provider, or a merchant that has not activated their service for a period of time). The merchant server 160 may send a request to the server 120 via the network 140 for a personalized recommendation, and the request may include data associated with the merchant, such as a business size of the merchant, a business strategy of the merchant, a usage preference of the merchant server 160, a business goal of the merchant, and/or product characteristics of the merchant. The merchant server 160 may then receive the personalized recommendation provided by the server 120 based on the data included in the request. The personalized recommendation may include suggested products of the service provider that is suitable for the merchant. In some embodiments, the personalized recommendation may further include a value change corresponding to a product. For example, the merchant may receive a recommendation including a report or analysis illustrating a potential value increment (e.g., revenue, an improvement to customer satisfaction score, etc.) if the merchant adds/implements a specific service/product (e.g., Pay Later® in response to the need of customers) to their merchant website. In some embodiments, the personalized recommendation may further include a suggestion or notification of a seasonal promotion. The seasonal predictor 126 may detect that the merchant may be a seasonal merchant (e.g., a retailer that focuses on selling Christmas decorations during winter season), such that the seasonal predictor 126 may include the seasonal promotion (e.g., a reminder to activate certain services in response to the upcoming season, and/or a discount on purchasing a product from the server provider) in the personalized recommendation that is to be sent to the merchant server 160 in response to the request, or the seasonal predictor 126 may proactively send a push or notification before the active season for the detected seasonal merchant to the merchant server 160.

The product predictor 122, the value evaluator 124, and the seasonal predictor 126 may be utilized randomly and flexibly in different orders in response to a request from the merchant server 160 (e.g., a need of the merchant). For example, the merchant may be interested in learning how much revenue can be created when adding a new product, the merchant may utilize the value evaluator 124 of the server 120 first, and then consider utilize the product predictor 122 and/or the seasonal predictor 126 when needed. In some embodiments, the administrator of the server 120 may utilize the seasonal predictor 126 first to target seasonal merchants, e.g., sending out emails before the peak season to keep the seasonal merchants engaged, and then utilize the value evaluator 124 to provide an analysis of revenue created by each product for the seasonal merchants, e.g., including the analysis in the emails for targeting the seasonal merchants. Therefore, the merchant personalization system 100 may provide a dynamic personalized recommendation by flexibly using the product predictor 122, the value evaluator 124, and the seasonal predictor 126 implemented at the server 120.

Figure 2:
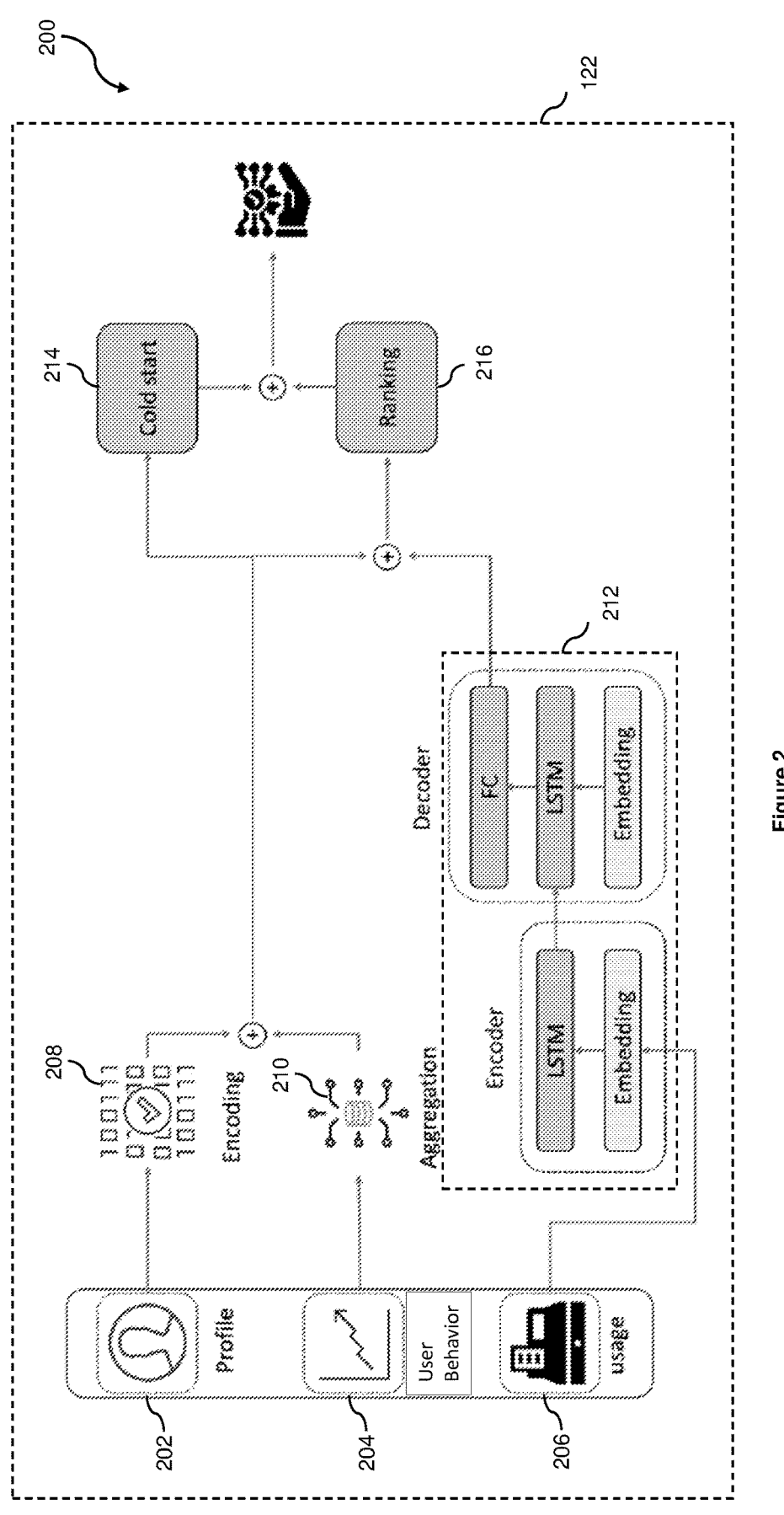
FIG. 2 illustrates an exemplary diagram of the product predictor for providing merchant recommendations according to an embodiment of the present disclosure.

FIG. 2 illustrates an exemplary diagram 200 of the product predictor 122 for providing merchant recommendations, according to various embodiments of the disclosure. In some embodiments, the product predictor 122 discussed in the exemplary diagram 200 may be implemented at the server 120 (as shown in FIG. 1). The product predictor 122 may have a multi-model architecture, including a Sequence-to-Sequence (Seq2Seq) model 212 for learning previous sequences of products, a cold start model 214 for providing recommendations for merchants who have not activated any products from the service provider, and a ranking model 216 for providing recommendations for merchants who have activated any products from the service provider. The Seq2Seq model 212 will be further described in detail in FIG. 3.

In a process of predicting the target product for the merchant, the product predictor 122 may receive data associated with the merchant, including a merchant profile 202, user behaviors 204 including statistic data for evaluating customer behavior (e.g., universal basic income), usage information 206 of the merchant, and the like. The received data may be fed to the Seq2Seq model 212 implemented at the product predictor 122 for generating a target product (e.g., a product that is the next product based on the previous sequence of products) for the merchant. In some embodiments, the Seq2Seq model 212 may be a long short-term memory (LSTM) network. The Seq2Seq model 212 may be trained and built based on a set of training datasets that each includes a sequence of products. The training dataset may include a sequence of products representing a sequence of actions/service products, and each action/service product may be associated with a corresponding product of the service provider. For example, when a user browses the merchant website, the user may utilize a search engine (e.g., a first product of the service provider) to look for an item, the user may then use a checkout service (e.g., a second product of the service provider) to buy the item, where the transaction may be validated by a card processing service (e.g., a third product of the service provider) to complete the purchase. Each product in the sequence of products may be represented by a number/value. For example, the service of search engine may be a value of 27, the service of checkout process may be a value of 32, and the service of card processing may be a value of 4. In this regard, the Seq2Seq model 212 may remember/learn the previous sequences of products (e.g., products/service being utilized in sequence), and predict the target product (e.g., the next possible product that the merchant might be needing based on the previous sequence of products).

In some embodiments, the Seq2Seq model 212 (e.g., a LSTM-fully connected network) may include an encoder and a decoder. When the Seq2Seq model 212 receives an input (e.g., the user behaviors 204) including a sequence of products (represented as values of 27 and 32), the encoder may process each value representing a corresponding product in the sequence of products sequentially at each occurrence of processing (e.g., reading the value of 27 first, then the value of 32) and generate a final output. The decoder may then generate a target value (e.g., the value of 4) which represents a target product based on the final output from the encoder, since the Seq2Seq model 212 has been trained and built based on a set of datasets including sequences of historical products (e.g., the Seq2Seq model 212 may infer the target value of 4 from the input sequence of 27 and 32 based on a sequence of historical products of 27, 32, and 4).

In some embodiments, the output (e.g., the inferred target product) of the Seq2Seq model 212 may be fed into two models (e.g., the cold start model 214 and the ranking model 216) to provide a catered recommendation for different merchants (e.g., front book merchants and back book merchants). For example, the output of the Seq2Seq model 212 may be sent to the cold start model 214 for the front book merchants and the ranking model 216 for the back book merchants. The cold start model 214 may provide recommendations for newly signed up merchants who have not activated any products yet (e.g., the early merchants) based on the inferred target products output by the Seq2Seq model 212. Furthermore, the cold start model 214 may utilize data associated with products that have been updated by other merchants which have similar characteristics (e.g., a business size of a merchant, a business strategy of a merchant, a usage preference of a merchant server, a business goal of a merchant, and/or product characteristics of a merchant) with an early merchant that requests the personalized recommendation. In some embodiments, the cold start model 214 may provide a recommendation for the early merchants based on product counts for each product of the products provided by the service provider. The ranking model 216 may provide recommendations for active merchants (e.g., merchants who have activated products provided by the service provider) based on the inferred target products output by the Seq2Seq model 212. Furthermore, the ranking model 216 may utilize data associated with products that have been updated by other merchants which have similar characteristics with an active merchant that requests the personalized recommendation. In some embodiments, the ranking model 216 may provide a ranking list including product counts for each product of the products provided by the service provider for the active merchants.

In some embodiments, data encoding 208 and aggregation 210 (in a database management system) may be applied to process the received data associated with the merchant, and results from the data encoding 208 and the aggregation 210 (e.g., relationships between different merchants) may be used to provide more information (e.g., a ranking list of the products) for the personalized recommendation. A further illustration of the actions performed at the product predictor 122 will be explained in a diagram in FIG. 3.

Figure 3:
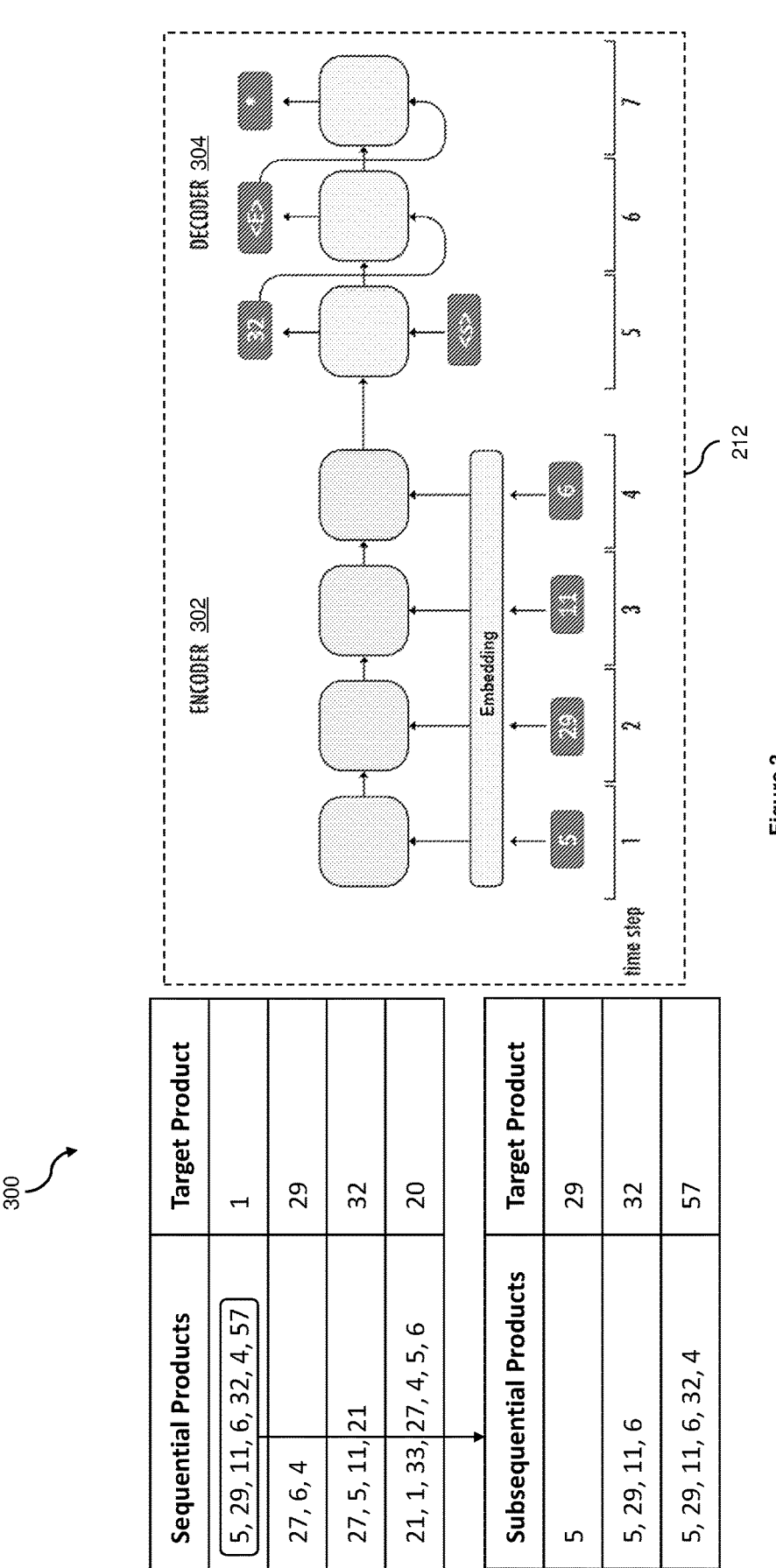
FIG. 3 illustrates an exemplary diagram of an encoder and a decoder of a Sequence-to-Sequence (Seq2Seq) model for learning historical sequential products according to an embodiment of the present disclosure.

FIG. 3 illustrates an exemplary diagram 300 of an encoder and a decoder of the Seq2Seq model for learning historical sequential products, according to various embodiments of the disclosure. As discussed previously, the Seq2Seq model 212, which is one of the models in the product predictor 122, may include an encoder 302 and a decoder 304 to learn from the previous sequence of products and output the target product. In some embodiments, the Seq2Seq model 212 may be implemented at the product predictor 122 as shown in FIG. 1.

The Seq2Seq model 212 may include the encoder 302 and the decoder 304. The Seq2Seq model 212 may be trained based on the datasets including sequences of historical products (e.g., a series of products that have been activated/ used in sequence). For example, the sequence of products in training dataset for the Seq2Seq model 212 may include a series of products (represented as values of 5, 29, 11, 6, 32, 4, and 57) that is activated during a period of time from a first time point to a second time point, and a target product (represented as a value of 1) after the second time point. Once the Seq2Seq model 212 has been built, the Seq2Seq model 212 may receive an input including a sequence of products (represented as values of 5, 29, 11, and 6), the encoder 302 may process each value at each time step (e.g., reading the value of 5 first, then reading the values of 29, 11, and 6 sequentially) and generate a final output for the decoder 304. The decoder 304 may generate a target value (e.g., the value of 32) which represents a target product based on the final output from the encoder 302. Furthermore, the output (e.g., the target product) of the decoder 304 may be sent to the cold start model 214 and the ranking model 216 to output a personalized recommendation for the merchants.

Figure 4:
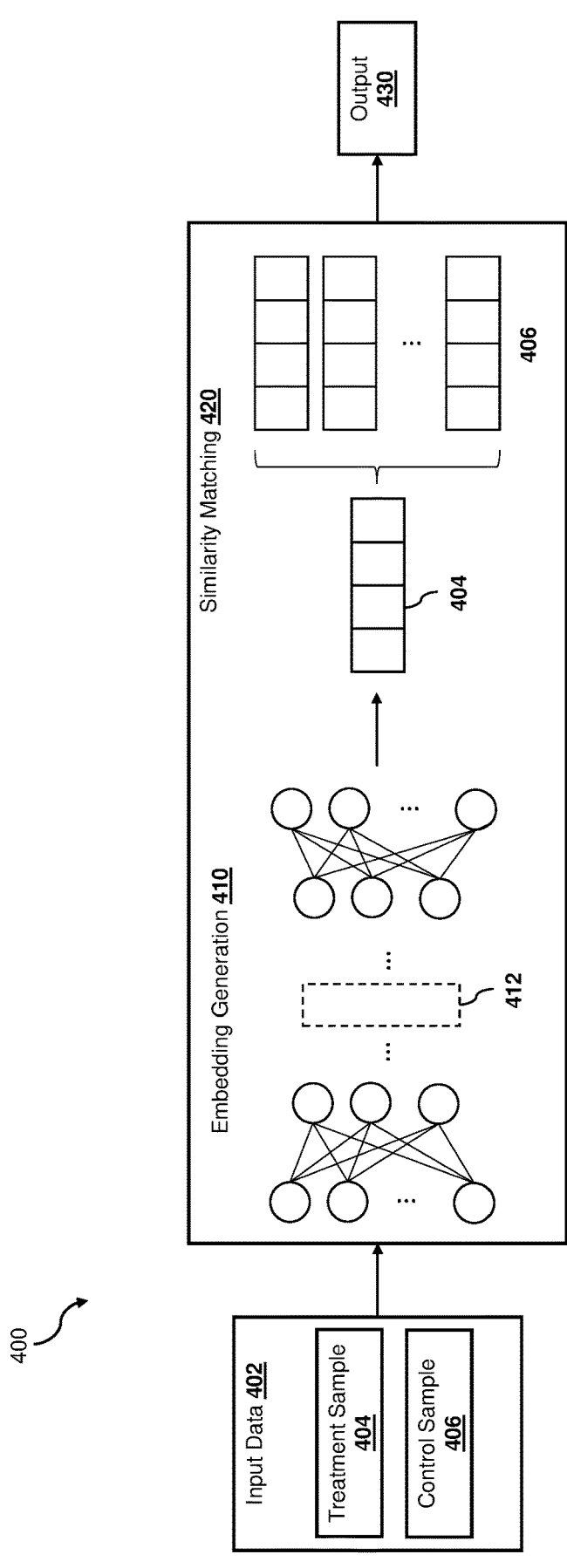
FIG. 4 illustrates an exemplary diagram of a method for preparing training datasets for training the value evaluator according to an embodiment of the present disclosure.

FIG. 4 illustrates an exemplary diagram 400 of a method for preparing training datasets for training model(s) at the value evaluator 124, according to various embodiments of the disclosure. As discussed, the value evaluator 124 for evaluating a value change for a product (e.g., a revenue that a product of the service provider may be created) may be implemented at the server 120 as shown in FIG. 1. The value evaluator 124 may be trained based on the training datasets that include historically observed data (e.g., a set of historical value changes corresponding to a set of products).

In some embodiments, input data 402 for training the value evaluator 124 may include a treatment sample 404 and a control sample 406. The control sample 406 may be randomly selected from the historical observed data historical experimental data. An autoencoder model may be used to perform embedding generation 410, and a nearest neighbors algorithm may be used for similarity matching 420 for the input data 402. For example, the model for preparing the training datasets may generate embeddings 412 for each sample in the treatment sample 404 and the control sample 406 using an autoencoder. In some embodiments, the step of generating embeddings may be skipped when a number of features in the input data 402 is small, e.g., below a threshold. The samples with embeddings may then be sent for the similarity matching 420. For example, the treatment sample 404 may be compared with multiple sets of the control samples 406, and the model may identify the most similar control samples 406 for the treatment sample 404 based on features/embeddings using the nearest neighbors algorithm (e.g., K-Nearest Neighbors (KNN) algorithm).

Figure 5:
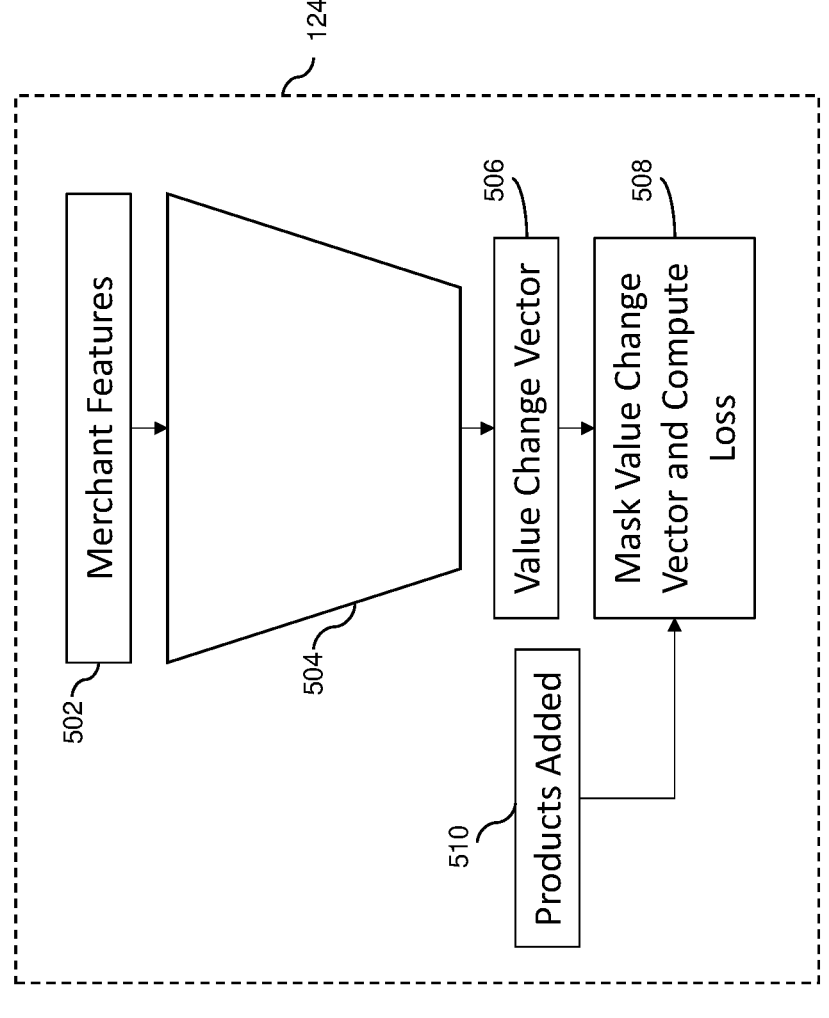
FIG. 5 illustrates an exemplary diagram of the value evaluator in predicting a value change of adding a product according to an embodiment of the present disclosure.

The model may then generate an output 430 indicating a value difference in the treatment sample 404 (e.g., a value change of the product). The difference/lift between the outcome 430 of the treatment sample and an aggregated outcome of control neighbors (e.g., the nearest/most similar control samples 406) may reflect the applied treatment sample 404, such that the value evaluator 124 may predict the potential value change for the product based on the output 430 accurately. A method for predicting the value change for the product by the value evaluator 124 will be further described in FIG. 5. FIG. 5 illustrates an exemplary diagram 500 of the value evaluator 124 in predicting a value change of adding a product, according to various embodiments of the disclosure. In some embodiments, the value evaluator 124 (as shown in FIG. 1) may process multiple products (e.g., all products of the service provider) and provide predicted value changes for multiple products. The value change of the product may indicate a potential value change when a product has been activated for a period of time comparing to the product has not been activated for the period of time. For example, the value evaluator 124 may predict/evaluate a revenue increment of a product of Pay Later® will create in twelve months if the merchant activates/adds the product of Pay Later® today. In some embodiments, the value evaluator 124 may include a feedforward artificial neural network (ANN) 504, specifically a fully connected multi-layer neural network (FCN) (e.g., multilayer perceptron (MLP)). When the value evaluator 124 is built to predict the value change for a single product, a standard MLP model may be utilized, and training datasets for such a standard MLP may include merchant features 502 (e.g., the size of the business, the characteristics of the products, the business goal of the merchant, etc.) and an added product (e.g., the output 430 prepared based on historical value changes of a product) to output the value change for the product. When the second value evaluator 124 is built to predict the value change for multiple products (e.g., all products of the service provider), a masked loss MLP may be utilized, training datasets for such a masked loss MLP may include the merchant features 502 to output value change vector 506. Furthermore, the value change vector 506 may be masked and used to compute loss 508 based on added products 510. In some embodiments, Huber loss function may be used in computing the loss. In some embodiments, the merchants may be scored based on all the products that they select to be inactive (e.g., the product that the merchant has not been used in the past 12 months).

In some embodiments, the value evaluator 124 may be trained based on training datasets that include historical value changes in response to additions of different products, and the training datasets may be created to have ground truth value change using a treatment-control based method as described in FIG. 4. In some embodiments, in creating the training datasets (e.g., the approach discussed in FIG. 4), a treatment sample and an eligible control sample may be created. Historical fairness through unawareness (FTU) of a product may be collected in the treatment sample. Furthermore, latent representation/embeddings for the merchants may be generated using autoencoder, and similar merchants may be identified from each treatment sample in the treatment group using KNN algorithm, and a difference in values between the treatment sample and the nearest control samples may then be used to estimate the value change for the treatment sample (e.g., evaluating the value change for the product using datapoints of in the nearest control samples), such that the accuracy of the predicted value change may be improved.

FIG. 6 illustrates an exemplary diagram 600 of the seasonal predictor 126 in detecting a seasonal merchant, according to various embodiments of the disclosure. As shown, the seasonal predictor 126 may implement at the server 120 for detecting a seasonal merchant (e.g., a merchant that may be significantly active during a specific period of the year). The seasonal merchant may be a category of merchants who have majority of their transactions concentrated over a short period of time (e.g., peak season, which can be measured in days, weeks, months, or other time frames). One of the characteristics of the seasonal merchant may be non-sticky to the service provider comparing with regular, active merchants. Also, the seasonal merchant may exhibit a declining transactional and engagement behavior in subsequent years, so that the service provider may utilize the seasonal predictor 126 to detect seasonal merchants to proactively connect with them to keep them engaged with the products of the service provider, e.g., sending reminder before the peak season starts.

The seasonal predictor 126 may select features for feature engineering and target encoding. In some embodiments, the selected features may include sequential features 602 (e.g., account actions, transactions derived, product additions, holiday features, product usage associated with the merchant), and static features 604 (e.g., geographical data, profile data, merchant industry data, etc.). In some embodiments, the sequential features 602 and the static features 604 may be categorial and/or numerical (e.g., statistic values to indicate merchant's behavior, such as a number of transactions associated with the merchant during a specific season). The sequential features 602 may be positioned in sequence and be mapped with calendar time, so that the sequential features 602 may provide a constant time reference for the seasonal predictor 126.

The seasonal predictor 126 may be a multi-task deep learning model that combines a 2D CNN 606 and MLP layers 608 (e.g., 12 to 24 layers). In some embodiments, the seasonal predictor 126 may include a light model (e.g., the training time may be less than 30 minutes). The seasonal predictor 126 may have customized loss functions for both tasks (e.g., detecting a seasonal merchant (seasonal forecast 610) and predicting transactions in a future time frame (transaction forecast 612)). In some embodiments, the seasonal predictor 126 may be trained and built using k-fold cross-validation (e.g., a 5-fold training with a customized framework). The seasonal predictor 126 may then output a first result 614 for the seasonal forecast 610 and a second result 616 for the transaction forecast 612 to determine whether a merchant is a seasonal merchant. For example, an exemplary output of [1] [0, 1, 1] may indicate that the merchant may be a seasonal merchant (e.g., a three-month seasonal seller), and the peak season for the merchant may occur in the next two and three months (e.g., "T+1", "T+2", and "T+3" may represent predicted transactions in the next one, two, and three months). Another exemplary output of [0] [0, 0, 0] may indicate that the merchant may not be a seasonal merchant, and the next three months may not be the peak/active season for the merchant. Furthermore, the output of the transactions forecast 612 provided by the seasonal predictor 126 may keep the merchant fully informed of a magnitude of revenue that the merchant may create in a specific period of time. In this regard, the outputs of the seasonal forecast and the transaction forecast may improve merchant risk assessment by lowering transaction risk (e.g., detecting abnormal transactions during non-peak season).

FIG. 7 illustrates an exemplary process 700 for generating a merchant recommendation, according to various embodiments of the disclosure. In some embodiments, at least a portion of the process 700 may be performed by the product predictor 122, the value evaluator 124, and the seasonal predictor 126, and apply approaches discussed in FIGS. 2-6. The process 700 begins by receiving (at step 705) at the product predictor 122, an input including a first sequence of values representing a series of products. The product predictor 122 may be trained based on a plurality of datasets, and each of the plurality of datasets comprises a second sequence of values representing a series of historical products. For example, the first sequence of values may be 32, 4, 57, and each value corresponds to a product (e.g., a service provided by the service provider, an action performed by a user, etc.), such as 32 represents a service of checkout process (e.g., the service of PayPal Checkout®), 4 represents credit card processing, and 57 represents Pay Later®. In some embodiments, the series of products may partially overlap with the series of historical products. For example, the second sequence of values may be 32, 4, 57, 5, 6, and each value corresponds to a historical product, such as 5 may represent authenticating with a bank associated with a user who initiates the service of Pay Later®, and 6 may represent setting up an installment plan.

The process 700 generates (at step 710), at the product predictor 122, an output including a target value representing a target product associated with the series of products. The product predictor 122 may include an encoder and a decoder, where the encoder may process each value in the first sequence of values sequentially at each occurrence of processing and generates a final output, and the decoder outputs the target value based on the final output from the encoder. In some embodiments, the product predictor 122 may include a recurrent neural network, such as a LSTM network. For example, the target product associated with the series of products (e.g., the series of products represented by the first sequence of values of 32, 4, 57) may be inferred by the product predictor 122, as the action of authenticating with the bank associated with the user.

The process 700 generates (at step 715), at the value evaluator 124, a value change associated with the target product based at least in part on the output. The value evaluator 124 may be trained based on historical value changes corresponding to each product of the series of products. In some embodiments, the historical values changes may be prepared by identifying the nearest product values from historical data for each product of the series of products. In some embodiments, the value change associated with the target product may indicate a value difference between a first projected value when the target product has not been activated for a period of time and a second projected value when the target product has been activated for the period of time. For example, the value evaluator 124 may be trained and built based on datasets including a value change (e.g., a customer value evaluated by customers) when a product of Pay Later® has been added to a merchant for 12 months comparing to when the product of Pay Later® has not been added to the merchant for 12 months. In some embodiments, the value change associated with the target product may be based at least in part on scoring each product of the series of products. For example, each product of the series of product is scored/assigned with a score by the user/merchant, such that when evaluating the customer value (include the value change), the process 700 may better provide a personalized recommendation.

The process 700 generates (at step 720), from the product predictor 122, a recommendation including the target product and the value change for the target product. For example, the recommendation may be provided to any potential merchant, such that the merchant may consider adding the target product (e.g., the product of Pay Later®) inferred based on existing products (or products that are potentially suitable for the merchant) included in the input to improve the value of the merchant.

In some embodiments, the process 700 may generate, at the seasonal predictor 126, a seasonal prediction for the output in a future time frame based on the output, and generate, at the product predictor 122, an updated output based on the seasonal prediction for the output in the future time frame. The updated output may include an updated value representing an updated target product that is recommended in the future time frame. In some embodiments, the seasonal predictor 126 may be trained based on the plurality of datasets and a second plurality of datasets, and the second plurality of datasets comprises static information of the series of historical products, such that the seasonal predictor 126 may be built to detect a seasonal merchant based on activities initiated by the merchant (including sequential features and static features).

In some embodiments, the process 700 may generate, at the product predictor 122, a second updated output based on the value change associated with the target product of the output. The second updated output may include a second updated value representing a second updated product that has an updated value change greater than the value change associated with the target product. For example, the updated second product (e.g., the service of setting up an installment plan) may create a greater customer value than the target product (e.g., the service of authenticating with the bank associated with a user who initiates the service of Pay Later®).

In some embodiments, the process 700 may rank, at the product predictor 122, the historical products based on results output by at least one of the product predictor 122, the value evaluator 124, or the seasonal predictor 126, and provide, from the product predictor 122, a ranked list of the historical products based on a result of ranking the historical products (e.g., a count of each service that has been activated).

Figure 8:
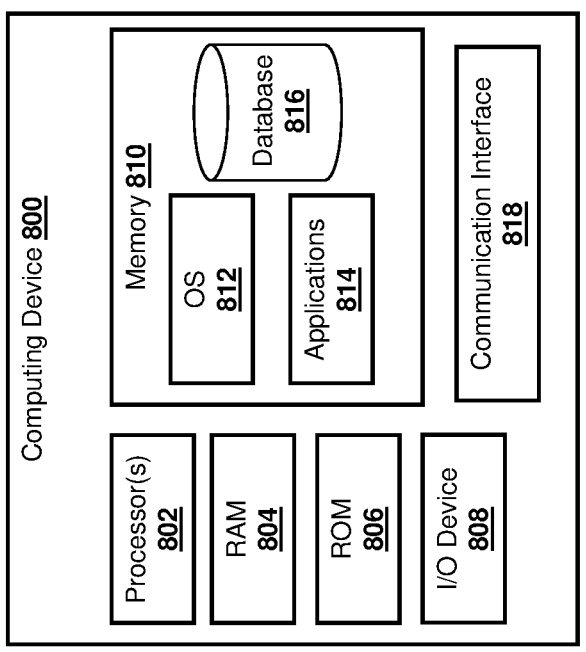
FIG. 8 is a block diagram that illustrates an exemplary of a computing device according to an embodiment of the present disclosure.

FIG. 8 illustrates a computing device 800 that may be used to implement the server 120, the user device 110, and the datasets database 130 according to various embodiments of the disclosure. For example, the computing device 800 may be the server 120 performing the actions disclosed in FIGS. 2 to 7. The computing device 800 may include a processor 802 for controlling overall operation of the computing device 800 and its associated components, including a random access memory (RAM) 804, a read only memory (ROM) 806, an input/output (I/O) device 808, a communication interface 818, and/or a memory 810. A data bus may interconnect the processor(s) 802, the RAM 804, the ROM 806, the memory 810, the I/O device 808, and/or the communication interface 818. In some embodiments, the computing device 800 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

The input/output (I/O) device 808 may include a microphone, keypad, touch screen, and/or stylus motion, gesture, through which a user of the computing device 800 may provide input. The I/O device 808 may also include one or more of a speaker for providing audio output and a video display device for providing textual, audiovisual, and/or graphical output. Software may be stored within the memory 810 to provide instructions to the processor(s) 802 allowing the computing device 800 to perform various actions. For example, the memory 810 may store software used by the computing device 800, such as an operating system (OS) 812, application programs 814, an associated internal database 816, and/or any software that implements the process 700 as described herein. The various hardware memory units in the memory 810 may include volatile and nonvolatile, removable and non-removable media implemented in any method or technology for storage of information such as computer-readable instructions, data structures, program modules, or other data. The memory 810 may include one or more physical persistent memory devices and/or one or more non-persistent memory devices. The memory 810 may include, but is not limited to, a RAM, a ROM, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by the processor(s) 802.

The communication interface 818 may include one or more transceivers, digital signal processors, and/or additional circuitry and software for communicating via any network, wired or wireless, using any protocol as described herein.

The processor(s) 802 may include a single central processing unit (CPU), e.g., a single-core or multi-core processor, or may include multiple CPUs. The processor(s) 802 and associated components may allow the computing device 800 to execute a series of computer-readable instructions to perform some or all of the processes described herein. Although not shown in FIG. 8, various elements within the memory 810 or other components in computing device 800, may include one or more caches, for example, CPU caches used by the processor(s) 802, page caches used by the operating system 812, disk caches of a hard drive, and/or database caches used to cache content from the database 816. In various embodiments, the database 816 may be the datasets database 130 described in FIG. 1. For embodiments including a CPU cache, the CPU cache may be used by the processor(s) 802 to reduce memory latency and access time. The processor(s) 802 may retrieve data from or write data to the CPU cache rather than reading/writing to the memory 810, which may improve the speed of these operations. In some embodiments, a database cache may be created in which certain data from the database 816 is cached in a separate smaller database in a memory separate from the database 816, such as in the RAM 804 or on a separate computing device. For instance, in a multi-tiered application, a database cache on an application server may reduce data retrieval and data manipulation time by not needing to communicate over a network (e.g., the network 140 described in FIG. 1) with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 800 are described separately, functionality of the various components may be combined and/or performed by a single component and/or multiple computing devices in communication without departing from the invention.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:

a non-transitory memory; and one or more hardware processors coupled with the non-transitory memory and configured to read instructions from the non-transitory memory to cause the system to perform operations comprising:

receiving, at a product predictor, an input comprising a first sequence of values representing a series of products, wherein the product predictor includes at least one machine learning model that is trained based on a plurality of datasets, and each of the plurality of datasets comprises a second sequence of values representing a series of historical products;

processing, using an encoder of the product predicter, each value in the first sequence of values sequentially at each occurrence of the processing, wherein the processing includes transforming the first sequence of values for sequential features processable with static features by the at least one machine learning model, and wherein the encoder utilizes the at least one machine learning model for the processing;

outputting, by the encoder to a decoder of the product predicter, a final value based on data for the static features and the sequential features, wherein the data is associated with the input and the processing each value in the first sequence of values;

generating, at the product predictor using the decoder, an output comprising a target value representing a target product associated with the series of products based at least on the final value from the encoder;

generating, at a value evaluator, a value change associated with the target product based at least in part on the output, wherein the value evaluator includes at least one machine learning model that is trained based on historical value changes corresponding to each product of the series of products; and generating, from the product predictor, a recommendation comprising the target product and the value change for the target product.

2. The system of claim 1, wherein the operations further comprise:

generating, at a seasonal predictor, a seasonal prediction for the output in a future time frame based on the output, wherein the seasonal predictor includes at least one machine learning model that is trained based on the plurality of datasets and a second plurality of datasets, and the second plurality of datasets comprises static information of the series of historical products, and generating, at the product predictor, an updated output based on the seasonal prediction for the output in the future time frame, wherein the updated output comprises an updated value representing an updated target product that is recommended in the future time frame.

3. The system of claim 1, wherein the operations further comprise:

generating, at the product predictor, a second updated output based on the value change associated with the target product of the output, wherein the second updated output comprises a second updated value representing a second updated product that has an updated value change greater than the value change associated with the target product.

4. The system of claim 1, wherein the historical values changes are prepared by identifying nearest product values from historical data for each product of the series of products.

5. The system of claim 2, wherein the operations further comprise:

ranking, at the product predictor, the historical products based on results output by at least one of the product predictor, the value evaluator, or the seasonal predictor; and providing, from the product predictor, a ranked list of the historical products based on a result of ranking the historical products.

6. The system of claim 1, wherein the value change associated with the target product indicates a value difference between a first projected value when the target product has not been activated for a period of time and a second projected value when the target product has been activated for the period of time.

7. The system of claim 1, wherein the value change associated with the target product is based at least in part on scoring each product of the series of products.

8. A method, comprising:

receiving, at a product predictor, a series of products, wherein the product predictor includes at least one machine learning model that is trained based on a plurality of datasets, and wherein each of the plurality of datasets comprises a series of historical products;

transforming, using an encoder of the product predictor, the plurality of products for sequential features processable with static features by the at least one machine learning model, wherein the encoder utilizes the at least one machine learning model for the transforming;

outputting, by the encoder to a decoder of the product predictor, a final value based on data for the static features and the sequential features, wherein the data is associated with the series of products and the transforming;

generating, at the product predictor using the decoder, a target product based at least on the final value from the encoder, wherein the target product is predicted for an action that takes place after a plurality of actions associated with the series of products;

generating, at a value evaluator and a seasonal predictor, a value change and a seasonal prediction in a future time frame, respectively, associated with the target product, based at least in part on the target product, wherein:

the value evaluator includes at least one machine learning model that is trained based on a set of historical value changes, wherein each of the set of historical value changes corresponds to a historical product of the series of historical products, and the seasonal predictor includes at least one machine learning model that is trained based on the plurality of datasets and a second plurality of datasets, wherein the second plurality of datasets comprises static information of the series of historical products; and generating, at the product predictor, an updated target product based on the value change and the seasonal prediction in the future time frame for the target product, wherein the updated target product has an updated value change greater than the value change associated with the target product in the future time frame.

9. The method of claim 8, wherein the series of historical products are associated with a sequence of the plurality of actions that happened sequentially.

10. The method of claim 8, further comprising:

determining, at the seasonal predictor, a seasonal merchant based on the seasonal prediction in the future time frame.

11. The method of claim 10, further comprising:

ranking, at the product predictor, the historical products based on results output by at least one of the product predictor, the value evaluator, or the seasonal predictor; and providing, from the product predictor, a ranked list of the historical products based on a result of ranking the historical products.

12. The method of claim 11, wherein the encoder processes each product in the series of products sequentially at each occurrence of processing and generates a final output, and wherein the decoder outputs the target product based on the final output from the encoder.

13. The method of claim 12, wherein the value change associated with the target product indicates a value difference between a first projected value when the target product has not been activated for a period of time and a second projected value when the target product has been activated for the period of time.

14. The method of claim 8, wherein the set of historical values changes are prepared by identifying nearest product values from historical data for each product of the series of products.

15. A non-transitory machine-readable medium having stored thereon machine-readable instructions executable to cause a machine to perform operations comprising:

receiving, at a product predictor, an input including a series of products, wherein the product predictor includes at least one machine learning model that is trained based on a plurality of datasets, and wherein each of the plurality of datasets includes a series of historical products;

processing, using an encoder of the product predicter, each product in the series of products sequentially, wherein the processing includes transforming the series of products for sequential features processable with static features by the at least one machine learning model, and wherein the encoder utilizes the at least one machine learning model for the processing;

outputting, by the encoder to a decoder of the product predicter, a final value based on data for the static features and the sequential features, wherein the data is associated with the series of products and the processing each product in the series of products;

generating, at the product predictor using the decoder, an output based at least on the final output from the encoder, wherein the output includes a target product is predicted for an action that takes place after a plurality of actions associated with the series of products;

generating, at a value evaluator, a value change associated with the target product based on the output, wherein the value evaluator includes at least one machine learning model that is trained based on historical values corresponding to each product of the series of products;

generating, at the product predictor, an updated output based on the value change associated with the target product, wherein the updated output comprises an updated target product that has an updated value change greater than the value change associated with the target product; and generating, from the product predictor, a recommendation comprising the updated target product and the updated value change associated with the updated product.

16. The non-transitory machine-readable medium of claim 15, wherein the operations further comprise:

generating, at a seasonal predictor, a seasonal prediction in a future time frame for the output based at least in part on the output, wherein the seasonal predictor includes at least one machine learning model that is trained based on the plurality of datasets and a second plurality of datasets, and wherein the second plurality of datasets comprises static information of the series of historical products.

17. The non-transitory machine-readable medium of claim 16, wherein the operations further comprise:

generating, at the seasonal predictor, a second updated output based on the seasonal prediction in the future time frame for the output, wherein the second updated output comprises a second updated target product that is recommended in the future time frame.

18. The non-transitory machine-readable medium of claim 17, wherein the operations further comprise:

ranking, at the product predictor, the historical products based on results output by at least one of the product predictor, the value evaluator, or the seasonal predictor; and providing, from the product predictor, a ranked list of the historical products based on a result of ranking the historical products.

19. The non-transitory machine-readable medium of claim 15, wherein the value change associated with the target product indicates a value difference between a first projected value when the target product has not been activated for a period of time and a second projected value when the target product has been activated for the period of time.

20. The non-transitory machine-readable medium of claim 15, wherein the value change associated with the target product is based at least in part on scoring each product of the series of products.

* * * * *